United States Patent
Hick et al.

[15] 3,699,340
[45] Oct. 17, 1972

[54] COMPTON SPECTROMETER HAVING PRIMARY AND SECONDARY DETECTORS WITH LOW AND HIGH ATOMIC NUMBERS, RESPECTIVELY

[72] Inventors: Harald Peter Hick; Rudolf Pepelnik, both of Vienna, Austria

[73] Assignee: Osterreichische Studiengesellschaft Fur Atomenergie Ges.m.b.H., Vienna, Austria

[22] Filed: Oct. 27, 1969

[21] Appl. No.: 869,734

[30] Foreign Application Priority Data

Oct. 31, 1968 Austria ................A 10646/68

[52] U.S. Cl. ..........................250/83.3 R, 250/83 R
[51] Int. Cl. ................................................G01t 1/24
[58] Field of Search............250/83.3 R, 83 R, 71.5 R Primary Examiner—James W. Lawrence
Assistant Examiner—Morton J. Frome
Attorney—Ernest G. Montague

[57] ABSTRACT

A compton spectrometer having semiconductors which intercept the primary and secondary or back scattered radiation. One of the detectors is made of a material having a low atomic number and the other detector is made of a material of high atomic number.

3 Claims, 5 Drawing Figures

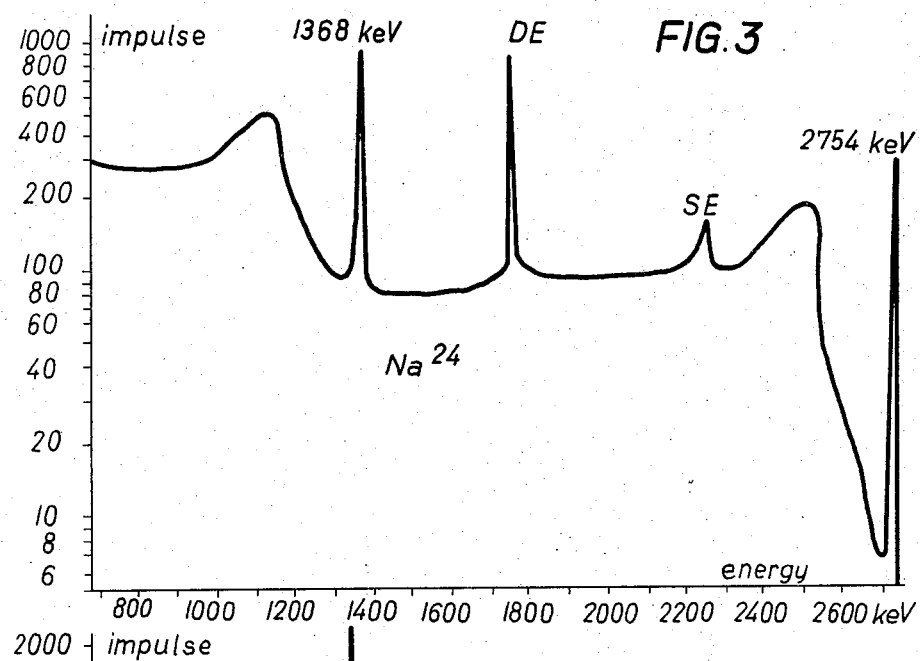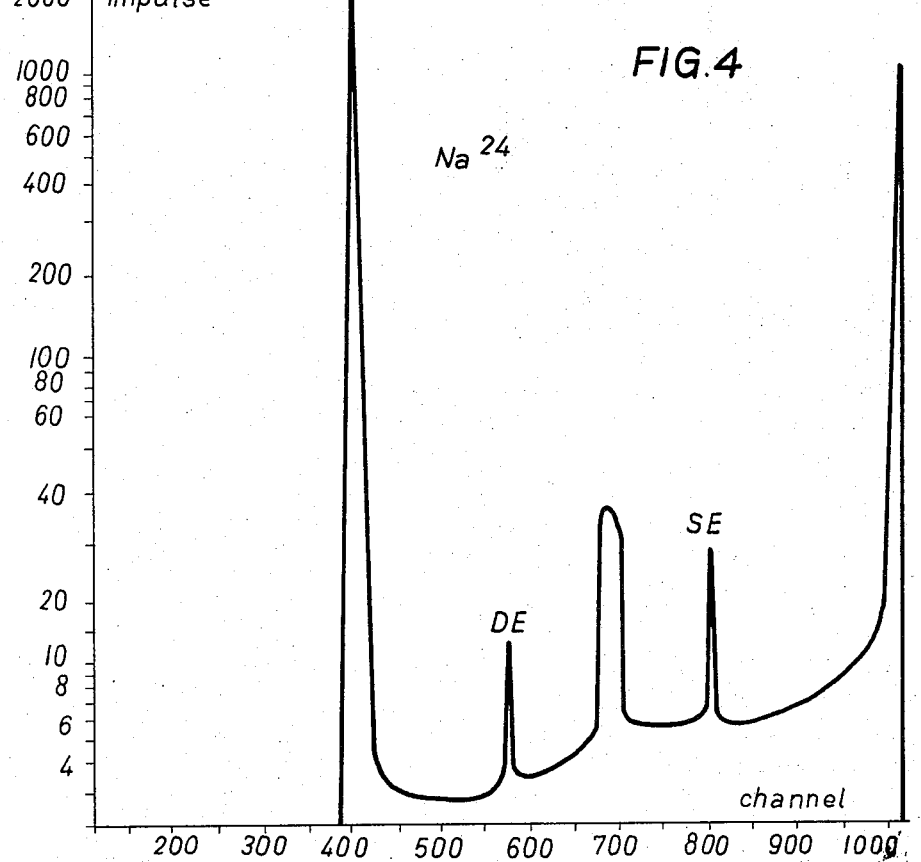

COMPTON SPECTROMETER HAVING PRIMARY AND SECONDARY DETECTORS WITH LOW AND HIGH ATOMIC NUMBERS, RESPECTIVELY

As known, the principle of a compton spectrometer lies in the fact that a gamma radiation is fed to a first detector and that a second detector receives the secondary or back scattered radiation. The compton electrons in the first detector give rise to pulses being in coincidence with the quanta at the second detector. If the second detector is arranged in an angle of about 180° the back scattered compton quanta have low energies (about 200 keV) being almost independent from the primary radiation.

It is an object of the invention to provide a spectrometer, the detector for the primary radiation of which, comprises a semiconductor of a material having a low atomic number, and the detector for the secondary or back scattered radiation of which comprises a semiconductor of a material having a high atomic number.

With the above and other objects in view which will become apparent in the following detailed description, the present invention will be clearly understood in connection with the accompanying drawings, in which:

FIG. 3 shows the spectrum of Na–24;

FIG. 4 illustrates the same spectrum obtained with the summing coincidence spectrometer.

Figure 1:
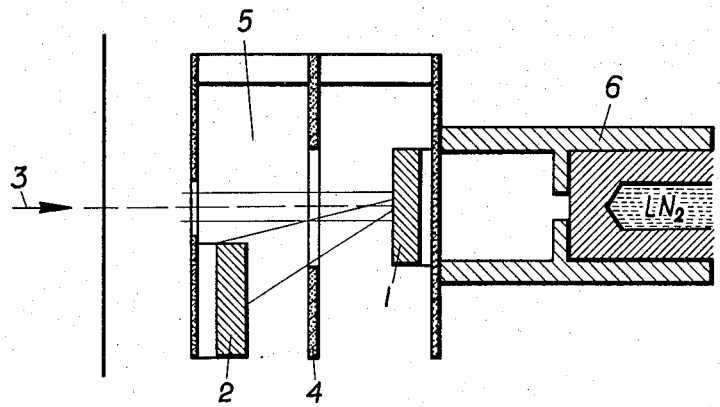
FIG. 1 is a schematic view of one possible arrangement of detectors in accordance with the present invention.

According to FIG. 1, collimated primary radiation 3 impinges upon a first detector 1 the back scattering of which is received by a detector 2. A collimator ring 4 between the two detectors avoids disturbances due to unwanted scattering from the walls of the chamber 5. Both detectors 1 and 2 are arranged at a common support 6 being cooled by liquid nitrogen.

Figure 2:
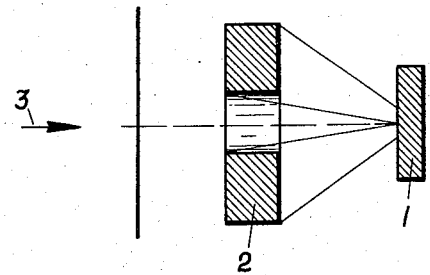
FIG. 2 is a schematic view of a different embodiment of the present invention.

FIG. 2 shows a different arrangement of the detectors; in this case the detector 2 is formed as a ring detector whereby the efficiency of the spectrometer is increased essentially.

Due to the Doppler-effect a line broadening takes place when using the compton spectrometer. It has been found that this line broadening can be avoided by summing, i.e., the pulses passed on from the two detectors, in case of coincidence, are summed up. However, above the pair production threshold energy, disturbances due to second order events show up.

FIG. 3 shows the spectrum of Na–24 recorded directly by detector 1. One can see that additional to the characteristic lines of 1,368 and 2754 keV, two lines show up; these lines are marked with SE and DE. If the spectrum is recorded by a summing coincidence spectrometer, as shown in FIG. 4, the underground can be suppressed almost completely. However, a third line can be found between the lines SE and DE. This third line is quite broad and has an energy corresponding to the sum of the energy of the line DE and the energy band selected by the single channel for the detector 2.

It has now been found that these disturbances can be removed if, for the detector 1, a material having a low atomic number and for detector 2, a material having a high atomic number is used. Examples for the detector 1 are Si(Li)-detectors and for detector 2 Ge(Li)-detectors, i.e., lithium drifted silicon- and germanium-detectors respectively.

Other examples for semiconductor materials having a high atomic number are indium-antimonide, indium-arsenide, indium-phosphide, gallium-antimonide, gallium-arsenide, cadmium-telluride, lead-telluride, cadmium-selenide. Other examples for semiconductors, having a low atomic number are organic semiconductors, boron etc.

Figure 5:
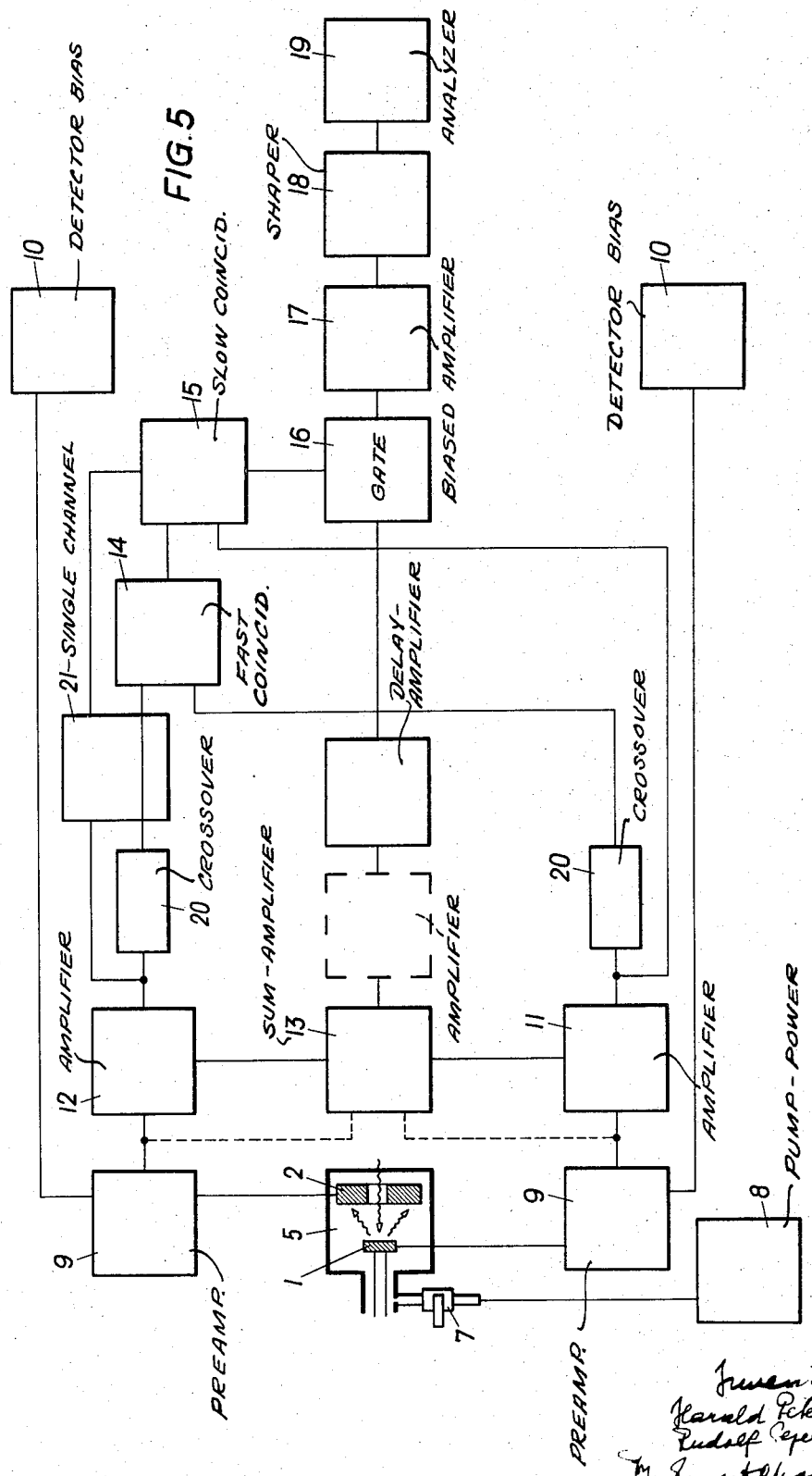
FIG. 5 is a circuit diagram for the electronic system.

FIG. 5 shows a circuit diagram showing the arrangement of the semiconductor detectors. The detectors 1 and 2 are arranged in a chamber 5 kept on the necessary vacuum by a ion pump 7 having a pump power 8. Each detector is connected by way of a pre-amplifier 9 to a detector bias 10 and an amplifier 11 and 12 respectively. The amplifiers 11, 12 are connected to a sum amplifier 13. The amplifiers 11, 12 are also connected by way of crossover 20 to a fast coincidence unit 14 which is followed by a slow coincidence unit 15 being in connection with a single channel unit 21. The slow coincidence unit 15 has a gate 16 which opens after receipt of a pulse of this slow coincidence unit 15, whereupon the pulse from the sum amplifier 13 can pass. From the gate 16 the pulses of the sum amplifier 13 come by way of a biased amplifier 17 and a pulse shaper 18 to an analyzer 19. The summing can also be effected after the pre-amplifier 9. This shown in broken lines in FIG. 5.

The invention can be used with the simple coincidence compton spectrometer as well as with the summing compton spectrometer.

What we claim is:

1. A compton spectrometer comprising semiconductor detectors including a primary semiconductor detector for intercepting primary radiation and a secondary semiconductor detector for secondary or scattered radiation, wherein the improvement comprises, said detector for the primary radiation being a semiconductor made of a material having a low atomic number and said detector for the secondary or scattered radiation being a semiconductor made of a material having a high atomic number.

2. A compton spectrometer comprising semiconductor detectors including a primary semiconductor detector for intercepting the primary radiation and a secondary semiconductor detector for secondary or scattered radiation, wherein the improvement comprises, material of the semiconductor detectors being drifted and said detector for the primary radiation being a Si-detector and the detector for the secondary or scattered radiation being a Ge-detector.

3. The compton spectrometer, as set forth in claim 1, wherein said first and second detectors are arranged with means for using the sum of the energies of the radiations detected by said two detectors for energy analysis of one radiation passing successively through both detectors in order to cancel disturbing effects of line broadening.

* * * * *